United States Patent
Aramaki

[11] Patent Number: 6,055,234
[45] Date of Patent: Apr. 25, 2000

[54] ATM SWITCHING CONTROL METHOD AND ATM SWITCH HAVING SHARED CELL MEMORY

[75] Inventor: Toshiya Aramaki, Tokyo, Japan

[73] Assignee: NEC Corporation, Tokyo, Japan

[21] Appl. No.: 08/870,722

[22] Filed: Jun. 6, 1997

[30] Foreign Application Priority Data

Jun. 6, 1996 [JP] Japan .................................... 8-144108

[51] Int. Cl.[7] .................................................. H04L 12/56
[52] U.S. Cl. ........................................... 370/389; 370/395
[58] Field of Search ................................... 370/358, 391, 370/392, 398, 359, 389, 395, 399, 411, 412, 413, 535, 537

[56] References Cited

U.S. PATENT DOCUMENTS

| | | | |
|---|---|---|---|
| 5,799,014 | 8/1998 | Kozaki | 370/358 |
| 5,825,767 | 10/1998 | Mizukoshi | 370/391 |

FOREIGN PATENT DOCUMENTS

| | | |
|---|---|---|
| 3-1633 | 1/1991 | Japan . |
| 3-36843 | 2/1991 | Japan . |
| 3-231539 | 10/1991 | Japan . |
| 5-122250 | 5/1993 | Japan . |
| 7-321795 | 12/1995 | Japan . |

OTHER PUBLICATIONS

T. Kozaki et al., "32×32 Shared Buffer Type ATM Switch VLSIS for B–ISDN", *1991 IEEE*, pp. 711–715.

*Primary Examiner*—Dang Ton
*Attorney, Agent, or Firm*—Sughrue, Mion, Zinn Macpeak & Seas, PLLC

[57] ABSTRACT

In an ATM switching control method, a table is formed to store the relationship between a memory address in a shared cell memory, at which an input cell is stored, and one of available area information indicating that the memory address in the shared cell memory is an available area and cell output information indicating that the memory address in the shared cell memory is an unavailable area. When a cell is to be input, available area information about the shared cell memory is used as a search key to search the table for a memory address in the shared cell memory. The input cell is stored in the shared cell memory in accordance with the searched memory address. Cell output information is stored in the table in accordance with the memory address in the shared cell memory at which the cell is stored. When the cell is to be read out, cell output information is used as a search key to search the table for a memory address in the shared cell memory. The cell is read out from the shared cell memory in accordance with the searched memory address. An ATM switch is also disclosed.

18 Claims, 5 Drawing Sheets

| AVAILABLE/ UNAVAILABLE AREA INFORMATION (OUTPUT PORT NUMBER) | OUTPUT ORDINAL NUMBER | MEMORY ADDRESS |
|---|---|---|
| AVAILABLE | 0 | 1 |
| AVAILABLE | 0 | 2 |
| AVAILABLE | 0 | 3 |
| AVAILABLE | 0 | 4 |
| ⋮ | ⋮ | ⋮ |

F I G. 3

| | OUTPUT PORT NUMBER | STORED INFORMATION |
|---|---|---|
| AVAILABLE | OUTPUT PORT 0 | 0000 |
| UNAVAILABLE (OUTPUT PORT NUMBER) | OUTPUT PORT 1 | 0001 |
| | OUTPUT PORT 2 | 0010 |
| | OUTPUT PORT 3 | 0011 |
| | OUTPUT PORT 4 | 0100 |

FIG. 7
PRIOR ART

ATM SWITCHING CONTROL METHOD AND ATM SWITCH HAVING SHARED CELL MEMORY

BACKGROUND OF THE INVENTION

The present invention relates to an ATM (Asynchronous Transfer Mode) switch and, more particularly, to an ATM switch having a shared cell memory that simplifies cell queuing control.

A conventional example of cell queuing control in an ATM switch having a shared cell memory will be described with reference to FIGS. 5, 6, and 7.

Figure 5:
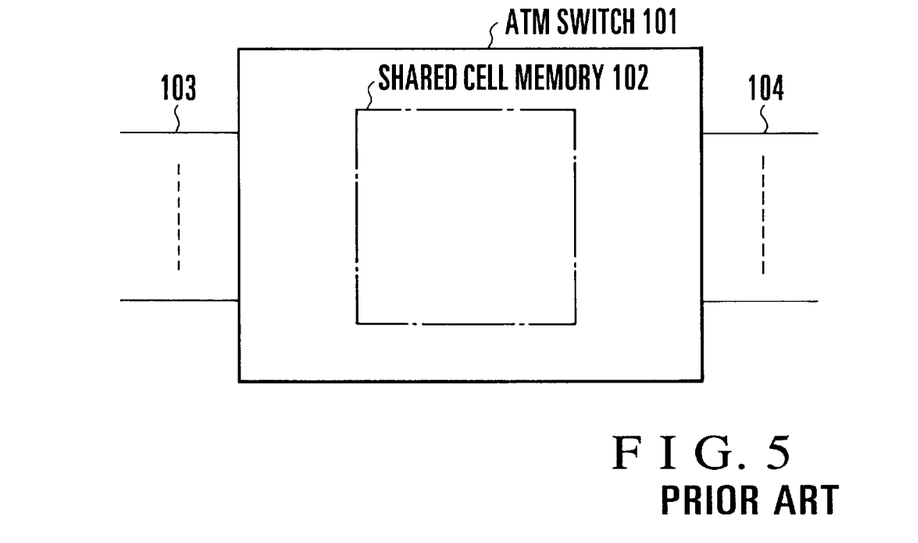
FIG. 5 is a block diagram showing the schematic arrangement of an ATM switch having a conventional shared cell memory.
Figure 6:
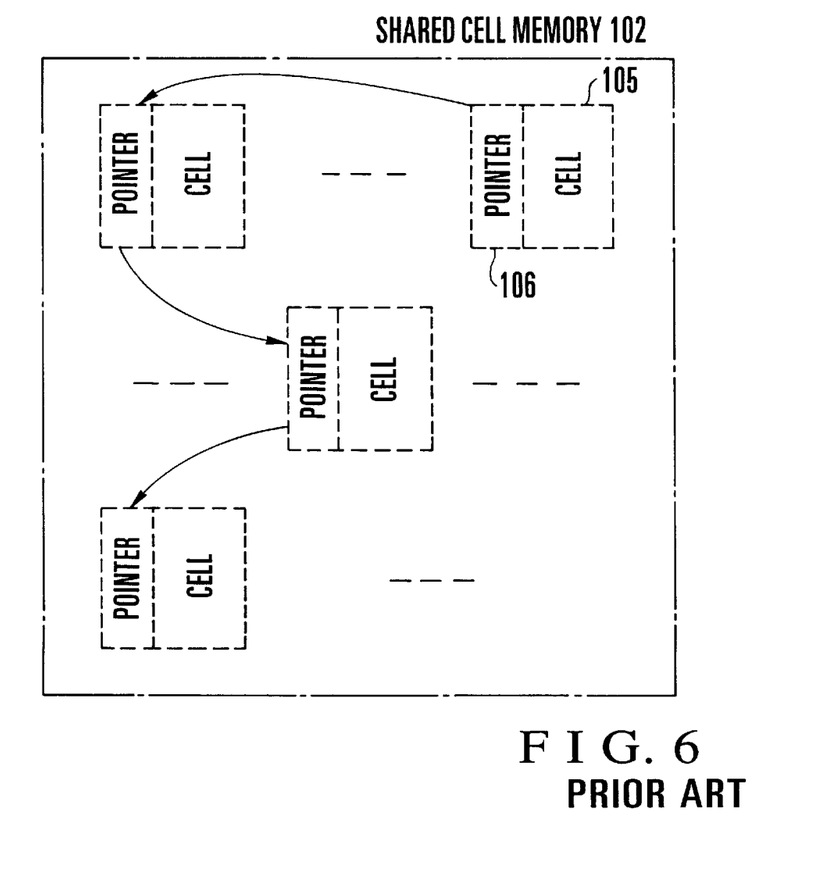
FIG. 6 is a view showing queuing control using pointers in the conventional shared cell memory.

According to an ATM switch of this type, as shown in FIG. 5, a shared cell memory 102 serving as a shared buffer is provided for an ATM switch 101 to perform read/write control such that cells from a plurality of input lines 103 are stored in available cell areas of the shared cell memory 102, and a series of cells are output in units of the line numbers of output lines 104.

The following two schemes are available as stored cell queuing control schemes that can realize control of cells from the shared cell memory in units of output lines and in the output order. The first scheme is a scheme of performing cell connection by using an address chain using pointers. As shown in FIG. 6, addresses (pointers) 106 in the shared cell memory 102 at which the next cells to be read out are stored in correspondence with cells 105 are stored. The second scheme is a scheme of performing address chaining by using a pseudo-address chain. As shown in FIG. 7, only the cells 105 are stored in available cell areas in the shared cell memory 102, and cell storage address managing sections 108 are used to store headers 107 and the like of the cells 105 in units of output lines and in the output order, thus performing queuing control In the conventional ATM switch designed to perform queuing control using the pointers 106 in FIG. 6, when the cells 105 are to be stored, available cell areas in the shared cell memory 102 are hunted in units of cells, and the cells 105 are written in the hunted areas. In addition to these operations, control must be performed to connect the cell areas by using the pointers 106. When a given cell 105 is to be transmitted, the pointer 106 of the previously readout cell 105 is checked, and the cell area designated by the checked pointer 106 is selected to read out the cell 105 therefrom. In addition to these operations, control must be performed to hold the pointer 106 of the readout cell 105 for the next check.

Figure 7:
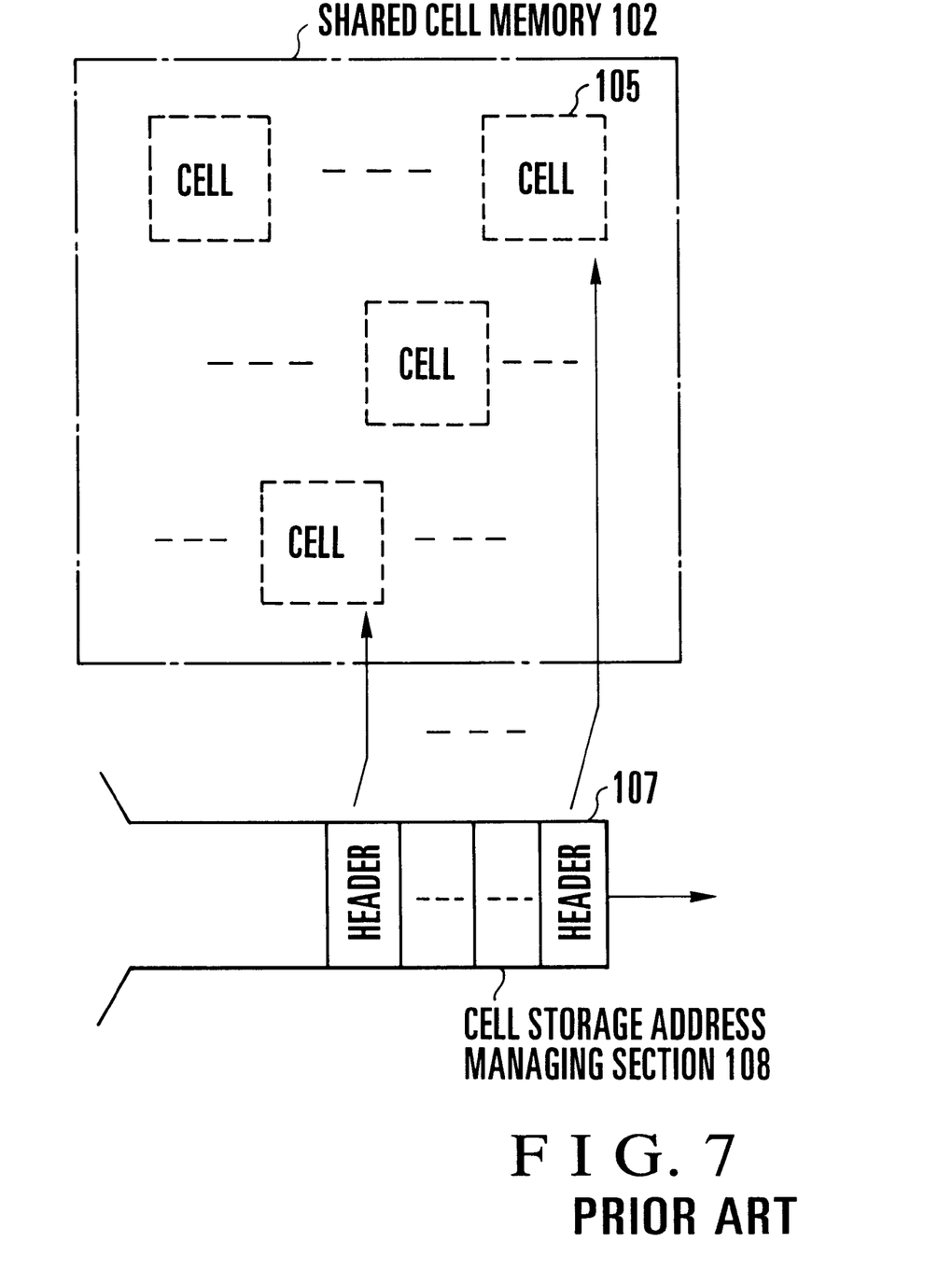
FIG. 7 is a view showing queuing control using the conventional shared cell memory and cell storage address managing sections.

In the conventional ATM switch designed to perform queuing control using a pseudo-address chain using the headers 107 in FIG. 7, when the cells 105 are to be stored, idle cell areas in the shared cell memory 102 are hunted in units of cells, and the cells 105 are written in the hunted cell areas. In addition to these operations, control must be performed to store the headers 107 detected from the cells 105 in the cell storage address managing sections 108 provided by the same number as that of the output lines in units of output lines and in the output order.

As described above, both the conventional ATM switches designed to perform queuing control require complicated control, resulting in complicated system configurations.

SUMMARY OF THE INVENTION

It is an object of the present invention to provide an ATM switching control method and an ATM switch which can realize simple cell area connection control by using a table such as a contents addressable memory.

In order to achieve the above object, according to the present invention, there is provided an ATM switching control method comprising the steps of forming a table in which a relationship between a memory address in a shared cell memory, at which an input cell is stored, and one of available area information indicating that the memory address in the shared cell memory is an available area and cell output information indicating that the memory address in the shared cell memory is an unavailable area, searching the table for a memory address in the shared cell memory by using available area information about the shared cell memory as a search key when the cell is to be input, storing the input cell in the shared cell memory in accordance with the searched memory address, storing cell output information in the table in accordance with the memory address in the shared cell memory at which the cell is stored, searching the table for a memory address in the shared cell memory by using cell output information as a search key when the cell is to be read out, and reading out the cell from the shared cell memory in accordance with the searched memory address.

DESCRIPTION OF THE PREFERRED EMBODIMENT

The present invention will be described in detail next with reference to the accompanying drawings.

Figure 1:
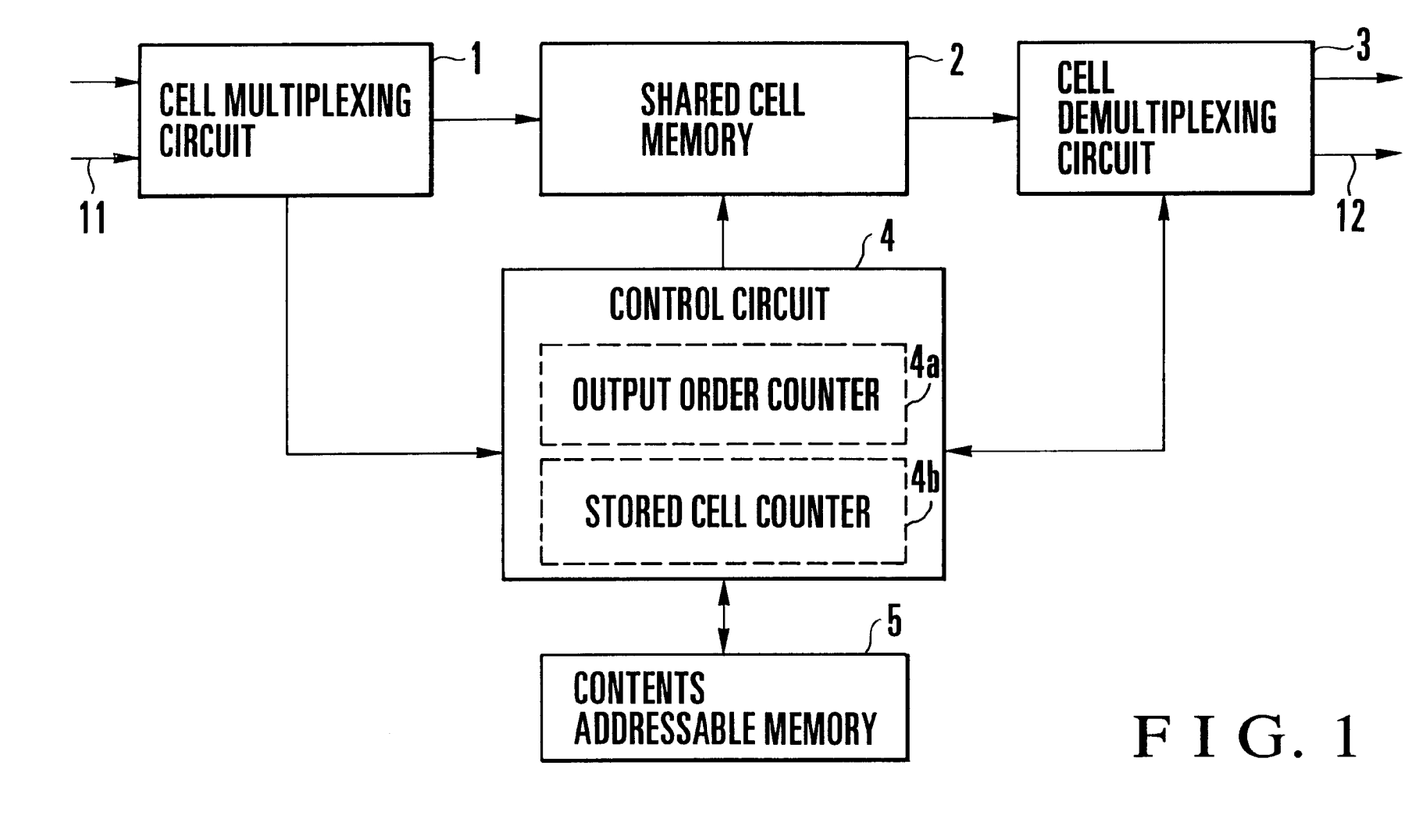
FIG. 1 is a block diagram showing the arrangement of an ATM switch according to an embodiment of the present invention.

FIG. 1 shows an ATM switch according to an embodiment of the present invention. Referring to FIG. 1, the ATM switch comprises a cell multiplexing circuit 1 connected to a plurality of input lines 11, a cell demultiplexing circuit 3 connected to a plurality of output lines 12, a shared cell memory 2 connected between the cell multiplexing circuit 1 and the cell demultiplexing circuit 3, a control circuit 4 having an output order counter 4a and a stored cell counter 4b and designed to perform queuing control on cells input to the cell multiplexing circuit 1, and a contents addressable memory (CAM) 5 connected to the control circuit 4 to store cell queuing information. The output order counter 4a is constituted by a plurality of counter circuits for counting the ordinal numbers of the cells output last in units of output lines (output ports). The stored cell counter 4b is constituted by a plurality of counter circuits for counting the numbers of cells stored in the shared cell memory 2 in units of output lines (output ports).

The cell multiplexing circuit 1 time-divisionally multiplexes asynchronous cells sent from the input lines 11 and outputs them to the shared cell memory 2. In addition, the cell multiplexing circuit 1 detects headers from the respective cells and outputs the output line numbers and output line ordinal numbers contained in the headers to the control circuit 4.

The shared cell memory 2 stores the cells output from the cell multiplexing circuit 1 in available areas in accordance with the memory addresses designed by the control circuit 4. In addition, the shared cell memory 2 reads out cells from the memory addresses in the shared cell memory 2 which are designated by the control circuit 4, and outputs the readout cells to the cell demultiplexing circuit 3.

The cell demultiplexing circuit 3 outputs the cells from the shared cell memory 2 to the output lines 12 designated by the control circuit 4.

As will be described later, the control circuit 4 searches for available cell areas in the shared cell memory 2 in units of cells output from the cell multiplexing circuit 1 in accordance with the contents addressable memory 5, and stores the cells at the memory addresses in the shared cell memory 2 which are the search result data. In addition, the control circuit 4 detects the cell output line numbers contained in the headers of the cells, and stores the detected output line numbers at cell storage memory addresses in the contents addressable memory 5. Furthermore, the control circuit 4 performs the adding operation of the output order counter 4a when each cell is output, and also performs the adding and subtracting operations of the stored cell counter 4b when each cell is stored and output.

Figure 2:
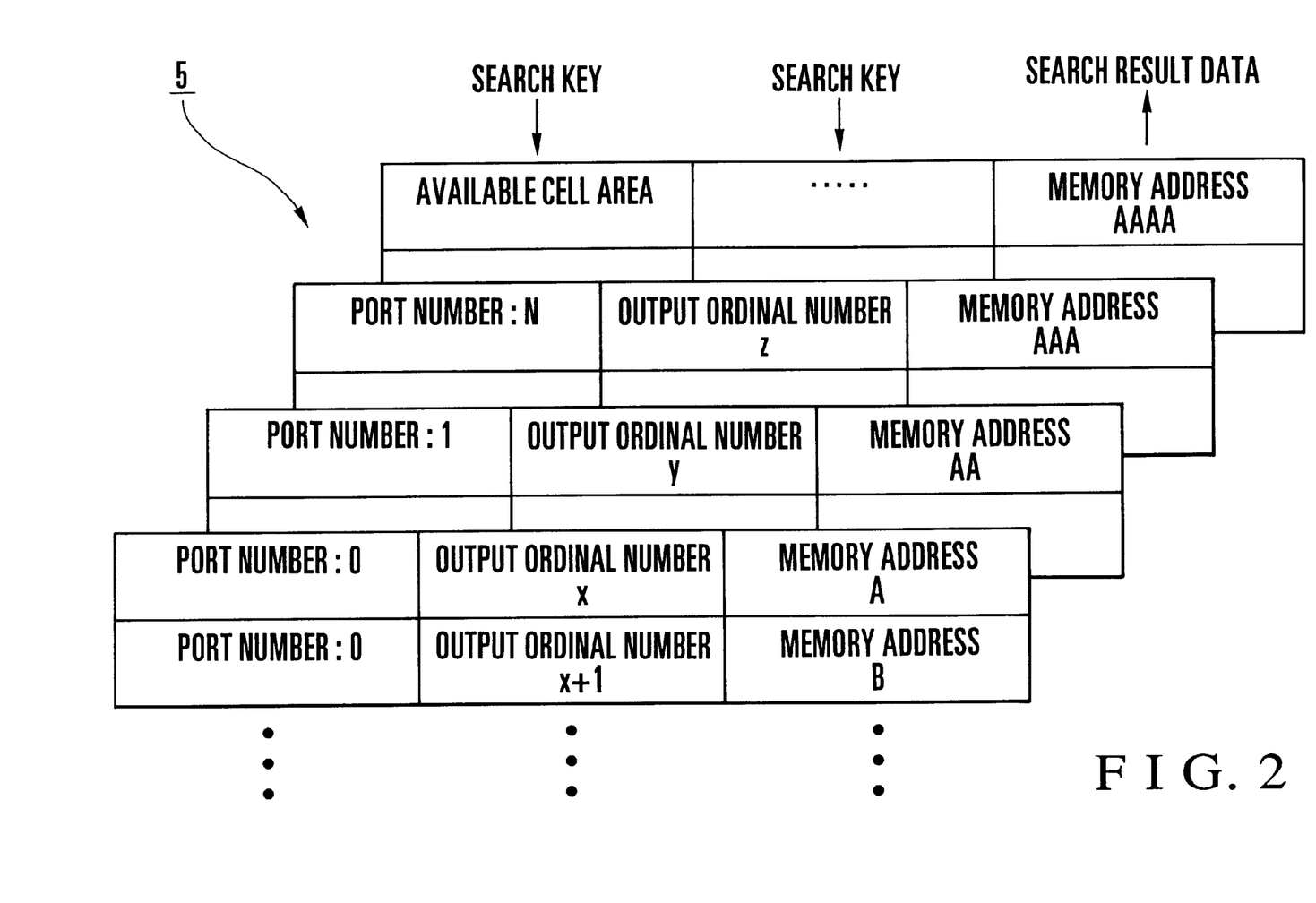
FIG. 2 is a table for explaining a contents addressable memory in FIG. 1.

The contents addressable memory 5 is a memory of the type that can store data and output information indicating the presence/absence of input data or corresponding data or output its address information. As shown in FIG. 2, the contents addressable memory 5 has a table indicating the relationship between the available cell areas in the shared cell memory 2 or output information and the corresponding memory addresses. When a given memory address in the shared cell memory 2 corresponds to an available area, the relationship between the available area in the shared cell memory 2 and its memory address is stored in this table. When a given memory address in the shared cell memory 2 corresponds to an unavailable area, the relationship between the corresponding output line number (output port number), the output ordinal number of the cell for the corresponding output line, and its memory address is stored in the table. With the use of this table, therefore, when a cell is to be stored in the shared cell memory 2, an available area is used as a search key to search for the memory address of the available area in the shared cell memory 2. When a cell is to be read out from the shared cell memory 2, the output ordinal number of the cell for the corresponding output port is used as a search key to search for the memory address at which the cell is stored. That is, memory addresses are always output as search result data from the shared cell memory 2.

Figure 3:
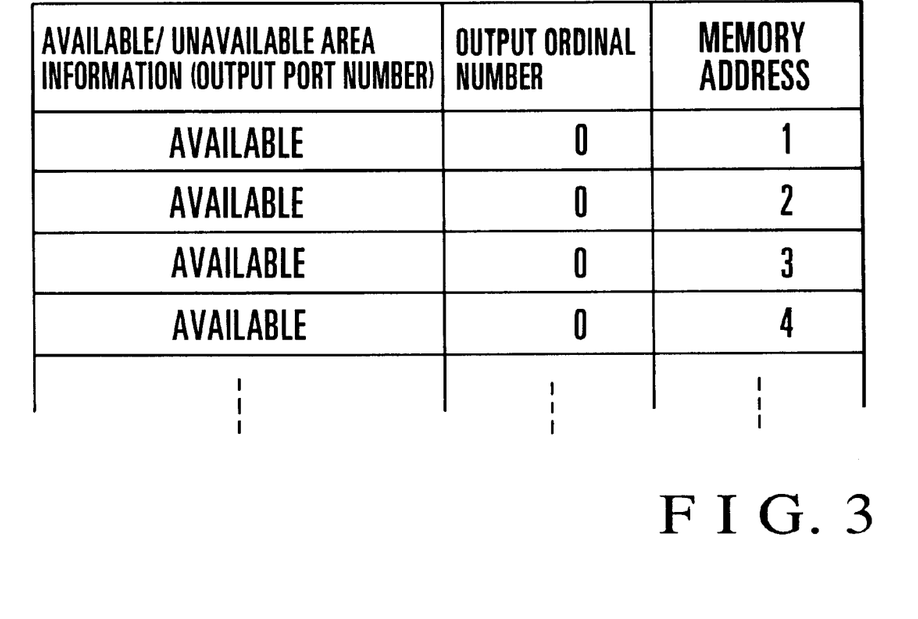
FIG. 3 is a view showing the contents of a contents addressable memory in its initial state.

Referring to FIG. 3, the contents addressable memory 5 has table areas in which pieces of information indicating whether the cell areas are available/unavailable (output port numbers) are stored in units of memory addresses in correspondence with the output ordinal numbers. That is, the memory addresses in the shared cell memory 2 at which cells are written are sequentially stored in advance in the table areas. In the initial state, since no cells are stored at the respective memory addresses, pieces of information indicating available areas are stored in all the available/unavailable table areas, and initial values of "0" are stored in the output ordinal number table areas, as shown in FIG. 3.

Figure 4:
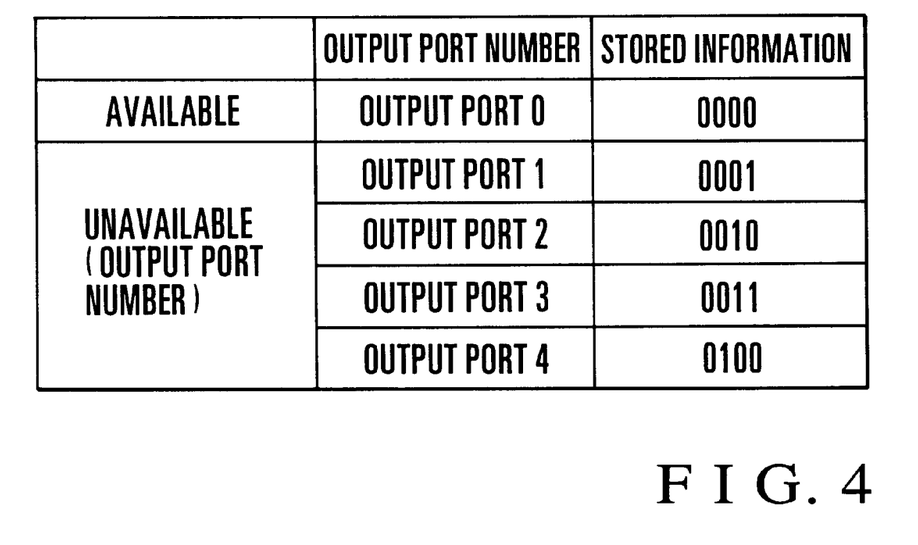
FIG. 4 is a view showing information stored in the contents addressable memory in FIG. 3 and indicating whether a corresponding cell area is available/unavailable.

FIG. 4 shows examples of the data stored in the available/unavailable table areas in the contents addressable memory 5 in FIG. 3 when the number of output ports is 4. Referring to FIG. 4, output port number 0 (stored information "0000") indicating an available area is stored at each memory address in the shared cell memory 2 at which no cell is stored. In correspondence with this stored information, "0" is stored in the corresponding cell output ordinal number table area in FIG. 3. At a memory address in the shared cell memory 2 at which a cell is stored, one of output port numbers 1 to 4 (stored information "0001" to "0100") indicating an unavailable area and the output port to which the cell is to be output is stored. In correspondence with this stored information, the output ordinal number of the cell is stored in the corresponding cell output line number table area in FIG. 3.

A cell storing operation will be described next.

Referring to FIG. 1, the cells received through the input lines 11 are time-divisionally multiplexed by the cell multiplexing circuit 1 and sequentially stored in the shared cell memory 2. In this case, the cell storing and queuing operations are performed by the control circuit 4 and the contents addressable memory 5.

When a cell is output from the cell multiplexing circuit 1, the control circuit 4 detects an output line number from the header in the cell, and uses the contents addressable memory 5 to search for the memory address of an available area in the shared cell memory 2 in which the cell is to be stored. That is, the control circuit 4 reads out the memory address of the available area by using "available area" information as a search key. For example, the control circuit 4 searches for the memory address of the available area by using output port number 0 (stored information "0000") as "available area" information. At this time, the contents addressable memory 5 outputs the memory address of one available area in the order of the memory address numbers in response to an inquiry from the control circuit 4. In this case, if there is no memory address designating an available area in the shared cell memory 2, the cell output from the cell multiplexing circuit 1 is discarded.

If there is an available area in the shared cell memory 2, and a memory address corresponding to the available area is obtained as a result of the search in the contents addressable memory 5, the control circuit 4 writes the cell output from the cell multiplexing circuit 1 at the obtained memory address in the shared cell memory 2. Thereafter, the control circuit 4 updates the "available area" information in the contents addressable memory 5 which corresponds to the search memory address into the output line number detected from the header, which is "unavailable area" information, e.g., output port number 1 (stored information "0001").

In addition, the control circuit 4 writes "current output ordinal number of output port number+current queuing length+1" as an output ordinal number in the contents addressable memory 5. In this case, the current output ordinal number is the ordinal number of the cell output last and held in the output order counter 4a for each output port. The cell queuing length is held in the stored cell counter 4b and corresponds to the number of cells currently stored in the shared cell memory 2 for each output port.

Finally, the control circuit 4 increments the stored cell counter 4b by one (addition of 1) in accordance with an increase in the number of queuing cells. In this manner, every time a cell is output from the cell multiplexing circuit 1, the above operation of writing the cell in the shared cell memory 2 is repeated. In accordance with the operation of writing the cell in the shared cell memory 2, the output line number (output port number) and the output ordinal number are stored in the contents addressable memory 5 at the address corresponding to the memory address in the shared cell memory 2 at which the cell is written, thus storing the table information.

The operations to be performed to read out cells from the shared cell memory 2 and transmit them will be described next.

When cells are to be output to the output lines 12, the cells to be output from the shared cell memory 2 to a plurality of output ports are sequentially read out as time-divisional multiplex signals, and the cell demultiplexing circuit 3 distributes the readout cells to the output lines 12.

At the read timing of a cell to a given output line number (output port number), the output ordinal number corresponding to the output line number (output port number) and held in the output order counter 4a is used as a search key to search for the corresponding memory address in the contents addressable memory 5. When the memory address at which the cell is written is output as the search result data, the cell is read out from the shared cell memory 2 in accordance with the output memory address. The readout cell is output from the cell demultiplexing circuit 3 to the output lines 12.

In this case, the control circuit 4 updates the "unavailable area" information in the contents addressable memory 5 which corresponds to the memory address from which the cell is read out into "available area" information, e.g., output port number 0 (stored information "0000"), and also updates the output ordinal number into "0". In addition, the control circuit 4 increments the immediately preceding output ordinal number held in the output order counter 4a by one (addition of 1), and decrements the cell queuing length held in the stored cell counter 4b by one (subtraction of 1). These incremented and decremented values are held for the above operation to be performed to store the next cell. At every cell output timing, the above cell read operation is repeated, and the cells are distributed to the output lines 12 by the cell demultiplexing circuit 3.

As described above, the control operations for cell storage and read operations with respect to the shared cell memory 2 are performed independently and concurrently, but parameters such as a queuing length and an output ordinal number are used for both the control operations. Therefore, the control operations for storage and read operations with respect to the shared cell memory 2 are performed at a timing after the above parameters are calculated and confirmed.

In the above embodiment, switching control is performed while the cell input and output lines are arranged in one-to-one correspondence. However, the present invention can also be applied to a case wherein cell input and output lines are arranged in one-to-N correspondence. More specifically, when cells are to be stored, available areas are used as keys to search for the memory addresses of the available areas corresponding to the output lines, and the cells are stored in the respective available areas with the same contents. The contents addressable memory is then controlled to store a plurality of output line numbers and output ordinal numbers, thus forming a table. In this manner, a multi-cast cell system for outputting cells from one input line to a plurality of output lines can be realized.

As has been described above, according to the present invention, the shared cell memory can be managed by only changing search keys and managing the queuing length for each output line, thereby realizing simple shared cell memory type ATM switching control. In addition, an ATM switch with simple control and a simple arrangement can be realized.

Furthermore, with the arrangement of the table of the contents addressable memory, the system can be easily upgraded to a multi-cast cell system for outputting one input cell to many output lines.

What is claimed is:

1. An ATM switching control method comprising the steps of:

forming a table in which a relationship between a memory address in a shared cell memory, at which an input cell is stored, and one of available area information indicating that the memory address in said shared cell memory is an available area and cell output information indicating that the memory address in said shared cell memory is an unavailable area;

searching said table for a memory address in said shared cell memory by using available area information about said shared cell memory as a search key when the cell is to be input;

storing the input cell in said shared cell memory in accordance with the searched memory address;

storing cell output information in said table in accordance with the memory address in said shared cell memory at which the cell is stored;

searching said table for a memory address in said shared cell memory by using cell output information as a search key when the cell is to be read out; and reading out the cell from said shared cell memory in accordance with the searched memory address;

said ATM switching control method further comprising the steps of, after a memory address in said shared cell memory is searched out for a cell read operation, storing available area information in said table in accordance with the searched memory address in said shared cell memory, and further wherein the cell output information comprises an output line number and an output ordinal number, and the step of storing the available area information comprises the step of storing an output line number which does not exist as available area information.

2. A method according to claim 1, wherein said table comprises a contents addressable memory, the step of searching for the memory address in said shared cell memory when the cell is to be input comprises the step of using, as a search result, a memory address in said shared cell memory, which is output from said contents addressable memory in accordance with input of the available area information about said shared cell memory, and the step of searching for the memory address in said shared cell memory when the cell is to be read out comprises the step of using, as a search result, a memory address in said shared cell memory, which is output from said contents addressable memory in accordance with input of the cell output information.

3. An ATM switch comprising:

cell multiplexing means for multiplexing cells input to a plurality of input lines;

a shared cell memory for storing the cells output from said cell multiplexing means;

cell distributing means for distributing the cells read out from said shared cell memory to a plurality of output lines;

a table in which a relationship between a memory address in said shared cell memory and one of available area information indicating that the memory address in said shared cell memory is an available area and cell output information indicating that the memory address in said shared cell memory is an unavailable area is stored; and control means for managing available areas in said shared cell memory and performing cell queuing control for each output line by searching for a memory address in said shared cell memory on the basis of said table by using available area information of the memory address in said shared cell memory as a search key when a cell is to be stored, and searching for a memory address in said shared cell memory on the basis of said table by using cell output information about said shared cell memory as a search key when a cell is to be read out, and wherein said ATM switch further comprises:

first count means for counting an output ordinal number for each output line; and second count means for counting the number of cells stored in said shared cell memory for each output line; and wherein said control means increments a count value corresponding to said second count means by one every time a cell is stored, and increments a count value corresponding to said first count means by one and decrements a count value corresponding to said second count means by one every time a cell is read out.

4. A switch according to claim 3, wherein said table comprises a contents addressable memory for outputting a corresponding memory address in said shared cell memory in response to input of available area information about said shared cell memory when a cell is to be stored, and outputting a corresponding memory address in said shared cell memory in response to input of cell output information when a cell is to be read out.

5. A switch according to claim 3, wherein said control means searches for a memory address in said shared cell memory from which a cell is to be read out, and then stores available area information in said table in correspondence with the searched memory address in said shared cell memory.

6. A switch according to claim 5, wherein the cell output information comprises an output line number and an output ordinal number, and said control means stores an output line number which does not exist as available area information.

7. An ATM switch comprising:

cell multiplexing means for multiplexing cells input to a plurality of input lines;

a shared cell memory for storing the cells output from said cell multiplexing means;

cell distributing means for distributing the cells read out from said shared cell memory to a plurality of output lines;

a table in which a relationship between a memory address in said shared cell memory and one of available area information indicating that the memory address in said shared cell memory is an available area and cell output information indicating that the memory address in said shared cell memory is an unavailable area is stored; and control means for managing available areas in said shared cell memory and performing cell queuing control for each output line by searching for a memory address in said shared cell memory on the basis of said table by using available area information of the memory address in said shared cell memory as a search key when a cell is to be stored, and searching for a memory address in said shared cell memory on the basis of said table by using cell output information about said shared cell memory as a search key when a cell is to be read out, and wherein said cell multiplexing means detects cell output information contained in header information of an input cell, said control means stores the detected cell output information in said table in correspondence with a memory address in said shared cell memory, and said cell distributing means distributes the cell read out from said shared cell memory to the output line on the basis of the detected cell output information.

8. A switch according to claim 7, wherein said table comprises a contents addressable memory for outputting a corresponding memory address in said shared cell memory in response to input of available are information about said shared cell memory when a cell is to be stored, and outputting a corresponding memory address in said shared cell memory in response to input of cell output information when a cell is to be read out.

9. A switch according to claim 7, wherein said control means searches for a memory address in said shared cell memory from which a cell is to be read out, and then stores available area information in said table in correspondence with the searched memory address in said shared cell memory.

10. A switch according to claim 9, wherein the cell output information comprises an output line number and an output ordinal number, and said control means stores an output line number which does not exist as available area information.

11. An ATM switch comprising:

cell multiplexing circuit for multiplexing cells input to a plurality of input lines;

a shared cell memory for storing the cells output from said cell multiplexing circuit;

cell distributing circuit for distributing the cells read out from said shared cell memory to a plurality of output lines;

a table in which a relationship between a memory address in said shared cell memory and one of available area information indicating that the memory address in said shared cell memory is an available area and cell output information indicating that the memory address in said shared cell memory is an unavailable are is stored; and control circuit for managing available areas in said shared cell memory and performing cell queuing control for each output line by searching for a memory address in said shared cell memory on the basis of said table by using available area information of the memory address in said shared cell memory as a search key when a cell is to be stored, and searching for a memory address in said shared cell memory on the basis of said table by using cell output information about said shared cell memory as a search key when a cell is to be read out, and wherein said ATM switch further comprises:

first count circuit for counting an output ordinal number for each output line; and second count circuit for counting the number of cells stored in said shared cell memory for each output line; and wherein said control circuit increments a count value corresponding to said second count means by one every time a cell is stored, and increments a count value corresponding to said first count circuit by one and decrements a count value corresponding to said second count circuit by one every time a cell is read out.

12. A switch according to claim 11, wherein said table comprises a contents addressable memory for outputting a corresponding memory address in said shared cell memory in response to input of available are information about said shared cell memory when a cell is to be stored, and outputting a corresponding memory address in said shared cell memory in response to input of cell output information when a cell is to be read out.

13. A switch according to claim 11, wherein said control circuit searches for a memory address in said shared cell memory from which a cell is to be read out, and then stores available area information in said table in correspondence with the searched memory address in said shared cell memory.

14. A switch according to claim 13, wherein the cell output information comprises an output line number and an output ordinal number, and said control circuit stores an output line number which does not exist as available area information.

15. An ATM switch comprising:

cell multiplexing circuit for multiplexing cells input to a plurality of input lines;

a shared cell memory for storing the cells output from said cell multiplexing circuit;

cell distributing circuit for distributing the cells read out from said shared cell memory to a plurality of output lines;

a table in which a relationship between a memory address in said shared cell memory and one of available area information indicating that the memory address in said shared cell memory is an available area and cell output information indicating that the memory address in said shared cell memory is an unavailable are is stored; and control circuit for managing available areas in said shared cell memory and performing cell queuing control for each output line by searching for a memory address in said shared cell memory on the basis of said table by using available area information of the memory address in said shared cell memory as a search key when a cell is to be stored, and searching for a memory address in said shared cell memory on the basis of said table by using cell output information about said shared cell memory as a search key when a cell is to be read out, and wherein:

said cell multiplexing circuit detects cell output information contained in header information of an input cell, said control circuit stores the detected cell output information in said table in correspondence with a memory address in said shared cell memory, and said cell distributing circuit distributes the cell read out from said shared cell memory to the output line on the basis of the detected cell output information.

16. A switch according to claim 15, wherein said table comprises a contents addressable memory for outputting a corresponding memory address in said shared cell memory in response to input of available are information about said shared cell memory when a cell is to be stored, and outputting a corresponding memory address in said shared cell memory in response to input of cell output information when a cell is to be read out.

17. A switch according to claim 15, wherein said control circuit searches for a memory address in said shared cell memory from which a cell is to be read out, and then stores available area information in said table in correspondence with the searched memory address in said shared cell memory.

18. A switch according to claim 17, wherein the cell output information comprises an output line number and an output ordinal number, and said control circuit stores an output line number which does not exist as available area information.

* * * * *